(12) United States Patent
Beik

(10) Patent No.: US 11,377,074 B2
(45) Date of Patent: Jul. 5, 2022

(54) ELECTRIC POWERED LANDING GEAR SYSTEM

(71) Applicant: Omid Beik, Vaughan (CA)

(72) Inventor: Omid Beik, Vaughan (CA)

( * ) Notice: Subject to any disclaimer, the term of this patent is extended or adjusted under 35 U.S.C. 154(b) by 127 days.

(21) Appl. No.: 17/028,793

(22) Filed: Sep. 22, 2020

(65) Prior Publication Data

US 2021/0094517 A1 Apr. 1, 2021

Related U.S. Application Data

(60) Provisional application No. 62/906,840, filed on Sep. 27, 2019.

(51) Int. Cl.
*B60S 9/00* (2006.01)
*B60S 9/04* (2006.01)

(52) U.S. Cl.
CPC ...................... *B60S 9/04* (2013.01)

(58) Field of Classification Search
CPC ...... B60S 9/00; B60S 9/04; B60S 9/18; B60S 11/00
See application file for complete search history.

(56) References Cited

U.S. PATENT DOCUMENTS

| | | | | |
|---|---|---|---|---|
| 6,425,604 B1 * | 7/2002 | Schubert | ................... | B60S 9/08 280/764.1 |
| 10,072,945 B1 * | 9/2018 | McGuire | ................ | G01P 15/16 |
| 10,857,983 B2 * | 12/2020 | Gillin | ........................ | F16H 7/06 |
| 2008/0116434 A1 * | 5/2008 | Quarberg | ................. | B60D 1/66 254/420 |
| 2014/0077140 A1 * | 3/2014 | Baird | ....................... | B60S 9/08 254/419 |
| 2019/0009757 A1 * | 1/2019 | Hicks | ....................... | F16H 1/22 |
| 2021/0094517 A1 * | 4/2021 | Beik | ....................... | B60S 9/04 |

* cited by examiner

*Primary Examiner* — Lee D Wilson
(74) *Attorney, Agent, or Firm* — Nasser Ashgriz; UIPatent Inc.

(57) ABSTRACT

The present invention is an electric powered landing gear system for semi-truck trailers using an electric motor supplied by the available voltage in the trailer via a motor controller. The system automates raising and lowering the landing gear. The system comprises a shaft motorized system operated by a 3-phase motor, a DC-to-AC motor controller, and a set of sprockets-and-chain mechanism. The electric motor implements a 3-phase winding and a brushless structure that requires no maintenance compared to direct current motors. The trailer provides the power for the electric motor through the motor controller. The motor controller comprises a digital electronic processor that implements an algorithm to optimize a sensorless control approach providing a variable speed and torque for the motor, and hence to the landing gear system, therefore simplifying the landing gears to a single speed from dual (or multi) speed/gear ratio. The motor controller implements a protection feature that limits over-currents when the landing gear legs are engaged to the ground or retracted to their static position, or when a fault occurs.

9 Claims, 18 Drawing Sheets

ELECTRIC POWERED LANDING GEAR SYSTEM

RELATED APPLICATION

The present invention claims priority of U.S. provisional application No. 62/906,840 entitled "Electric Powered Landing Gear System", filed on Sep. 27, 2019.

FIELD OF THE INVENTION

The present invention relates in general to landing gear systems for semi-truck trailers, and in specific to automation and electrification of landing gears.

BACKGROUND OF THE INVENTION

This invention is related to automation and electrification of semi-truck trailer landing gear systems. Usually, semi-truck trailers are equipped with landing gears, which support the front of the trailer during parking and storage of the trailer, and when changing trailers on the tractor. Semi-trailers have a set of landing gears with either pads or rollers mounted toward the front of the trailer, which allow raising, lowering and support of the forward end of the trailer in engagement and disengagement from the tractor or truck. The landing gears also allow the trailer to be freestanding when not in transit. In most instances, the trailer itself is decoupled from a tractor and then re-coupled to either the same tractor or another, depending on the logistics appropriate to the use.

The existing commercially available landing gear systems use a hand-crank handle to lower or raise the landing gear legs. This is a manually intensive practice, which can cause possible injuries to the user. Furthermore, this is a time-consuming process, which can be important when in rush or in poor weather conditions.

Prior art discloses several improvements to the hand crank, such as "Sixth Wheel Ratchet", commercialized by Dixie Industries, and "EASY-BAR™" crank handle, commercialized by SAFholland. Although the modified hand-cranks improve the operation of the landing gear, the time-consuming process and risk of injuries still exist.

Other means for raising and lowering of the landing gear are also known in the prior art, such as the use of hydraulic pistons or air cylinders receiving air from an air brake line of the trailer. These devices are large, heavy, expensive and low efficiency in operation. They also do not provide a very secure support, as there are some reports on their failure.

Some automated approaches, including pneumatic, hydraulic and external electric devices, for landing gear systems have been proposed. U.S. Pat. No. 8,590,417B1 discloses a trailer landing gear apparatus together with an external battery powered handled power tool, similar to an electric drill/impact wrench. US20130264806A1 also discloses a battery powered portable device that is charged externally and is similar to a shoulder held electric impact wrench. US patent application 20020053794A1 discloses a Landing gear lift apparatus, which is a portable electric device for automation of the trailer landing gear. U.S. Pat. No. 7,311,331B2 further discloses a method and apparatus for raising and lowering a trailer. This device is a motor with a gearbox mounted on the cross-shaft between the two legs of landing gear. To install the device, the cross-shaft is required to be removed and re-joint.

US20190009757A1 discloses another externally powered device for lowering and raising a trailer. This device has a motor configured to drive a planetary gear assembly in a gearbox in a landing gear system. U.S. Pat. No. 5,911,437 discloses an air driven impact wrench and adaptor, and U.S. Pat. No. 5,004,267 discloses a power operated support hydraulic device based on fluid-motor, to raise and lower the landing gear. And "PTS50", provided by Prime Transport Solutions is a pneumatic landing gear product that replaces hand-cranked gear.

It is noted that all of the prior art have existed for sometimes, yet there is no significant commercialization of these arts. The existing hydraulic and pneumatic devices are complicated, heavy, inefficient, and require significant maintenance. The externally charged electric devices have a battery system that requires an external charger, the drivers need to carry the device with themselves, and charge the device beforehand. The existing proposed electrified solutions are complicated, they require battery systems to operate, and require significant efforts in installation and maintenance. Due to the complexity, excessive weight, volume, and expense of prior art systems for raising and lowering semi-truck trailer landing gears, they have not been widely used in the trucking industry.

Therefore, there is a need for an automated raising and lowering device to use and overcome the drawbacks of the externally charged electric devices that require a battery system, and which require the implementation of extra circuitry for charging and/or require the drivers to carry a portable charger with themselves. Additionally, the batteries have operational issues when the trailer are parked for prolong period of time, especially in a hot/cold weather conditions.

SUMMARY OF THE INVENTION

The present invention is an electric powered device for raising and lowering landing gears of a trailers. In one embodiment, the device has a motorized system comprising a main shaft adapted to be coupled to the landing gear shaft through a sprocket-and-chain mechanism. The sprocket-and-chain mechanism is connected to a 3-phase electric motor which has a motor shaft and a motor controller configured to control motor speed and torque, and provide a variable and adjustable speed and hence timing operation.

The sprocket-and-chain mechanism is connected to the electric motor and comprises a set of sprocket-chain mechanism arranged between the motor shaft and the main shaft and rotatable around an axis of the motor shaft and the main shaft. The motor controller is used to control the applied torque on the main shaft and then to the landing gear shaft and to continually adjust the motor speed and eliminate the need for a multi gear ratio.

The motor controller comprises of (i) power modules controlled electronically using pulse width modulation (PWM) technique, (ii) electronics and protection circuitry that protect the motor controller from over-currents in case of high-loads and mis-operation, and (iii) a digitally implemented processor with an algorithm for sensorless control to determine an optimum running speed and torque, and hence an optimum main shaft rotational speed and torque corresponding to the landing gear shaft.

The electric motor causes the motor shaft to rotate the sprocket-and-chain mechanism to transfer the torque and speed from the electric motor to the main shaft and then to the landing gear shaft to extend and retract the landing gear legs. The landing gear shaft may or may not be connected to a gearbox as part of the landing gear system.

The electric motor can impart torque to the motor shaft and thereby to the sprocket-and-chain mechanism and drive the landing gear shaft and reduce the motor speed while increasing the torque. The electric motor is configured to provide a variable speed. The motor controller comprises a speed controller to set the device at a desired speed, control the motor shaft rotation speed ranges which correspond respectively to the sprocket-and-chain mechanism and the landing gear shaft. The motor controller also has a current control that controls the changes in current to start or stop the device. The motor controller is configured to continually control the current so that the landing gear is always adjusted on low gear to eliminate the need for dual gear ratio on the landing gear. Therefore, by utilizing the presented invention the landing gear becomes single speed hence simpler gearbox, which significantly reduces the complexity, cost, mass, and volume of the landing gears.

A set of UP, DOWN electronically controlled switches is provided to control the operation of the device. The switches are connected to the motor controller to control functions of the device. The motor controller receives indication from the UP and DOWN switches to operate the unit from either raise or lower modes. The controller includes a sensorless and digitally implemented algorithm that stops the unit when the landing gear legs have engaged the ground in the lowering mode, and when the landing legs have reached their retracted position in raising mode.

The trailer provides the power for the electric motor through the motor controller. The motor controller comprises digital electronics processor that implements an algorithm to optimize a sensorless control approach providing a variable speed and torque for the motor, and hence to the landing gear system. The motor controller implements a protection feature that limits over-currents when the landing gear legs are engaged to the ground or retracted to their static position.

The electric powered landing gear device is installed in a casing and being mounted on one of the landing gear legs, depending on the type of the landing gear. The device has been specifically designed to be retrofitted to the most common forms of landing gears.

Therefore, It is an objective of the present invention to provide an automated raising and lowering device for the landing gear system using an electric motor, a sensorless electronic controller, and a sprocket-and-chain system to use and overcome the drawbacks of the externally charged electric devices that require a battery system.

It is another object of the present invention to provide a system to overcome the drawbacks of the manual approaches with hand crank which are time-consuming.

It is another object of the present invention to reduce the risk of injuries and discomfort and health for the drivers.

It is another object of the present invention to significantly reduce the operation time which is beneficial for the drivers especially in cold and hot weather to prevent the driver to be exposed to extreme conditions for a long time.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
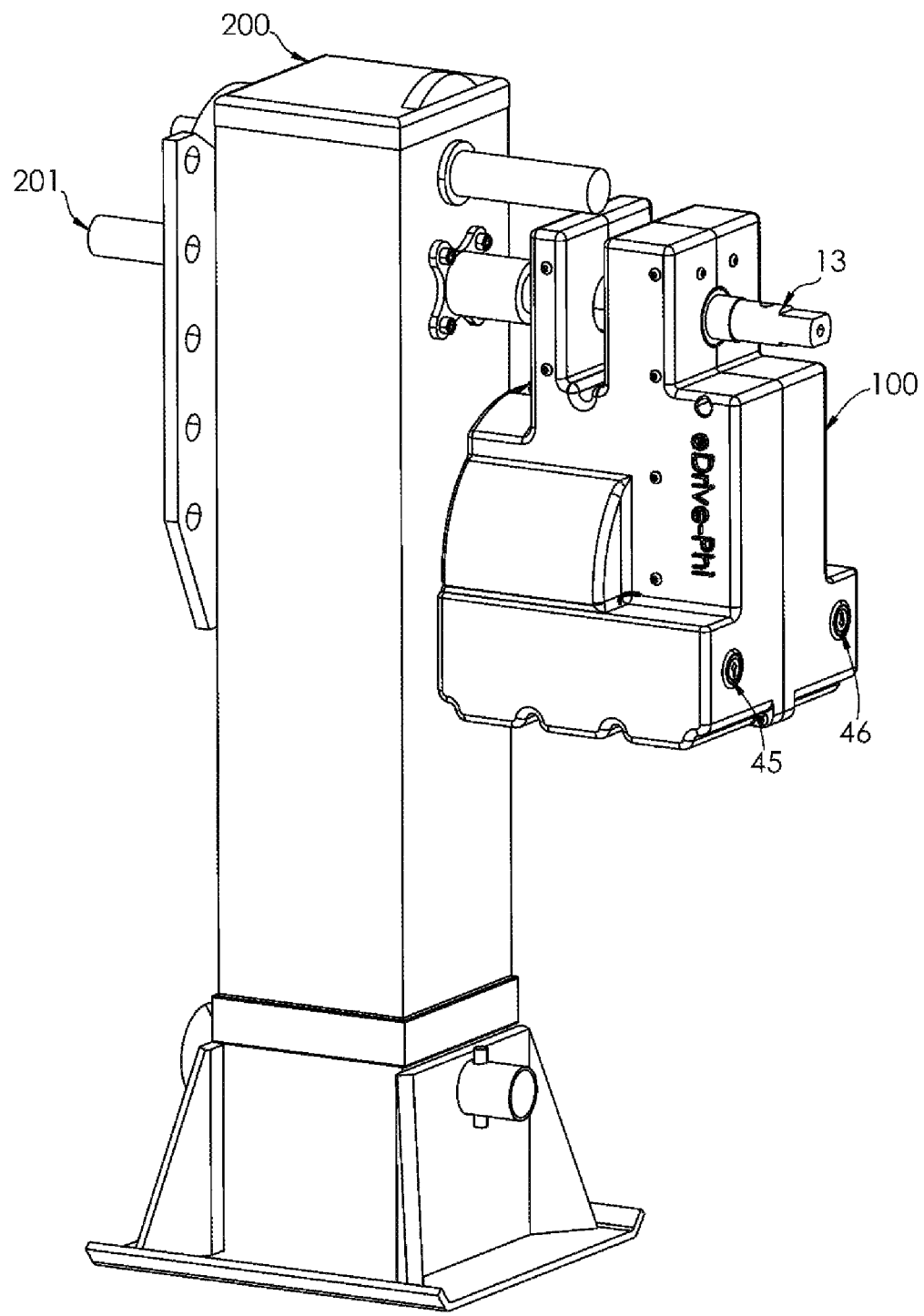
FIG. 1 is a perspective view of an embodiment of the electric powered landing gear device in accordance with the landing gear system.

According to FIGS. 1 to 5C the electric powered landing gear system of the present invention 100 is a motorized system to automate the process of raising and lowering semi-truck trailer landing gear 200. The device 100 will be mounted on the leg 17 or 18 of the landing gear assembly 200 disposed underneath a semi-trailer. The landing gear legs 17 and 18 comprise of legs which contact with the ground when fully extended. A landing gear shaft 201 which when rotated, will either raise or lower the legs 17 and 18 of the landing gear according to the direction in which the shaft 201 is rotated as is known in the art.

The landing gear legs 17 and 18 are secured respectively to the frame structure of the trailer. The legs 17 and 18 are retracted upwardly when the trailer is coupled to the tractor to prevent the legs from contacting the ground during towing of the trailer. When the trailer is to be uncoupled from the tractor, the legs 17 and 18 are extended downwardly to jack the trailer upwardly off of the "fifth wheel" of the tractor and to enable the trailer to stand alone.

The electric powered device for raising and lowering the landing gear 100 is a motorized system comprising of an electric motor 11 with a motor shaft 12 to drive a main shaft 13 through a set of sprockets 14 and 15 and a chain 16. The main shaft 13 is a hollow shaft to be mounted onto the landing gear shaft 201, which in existing trailers a hand crank is attached thereto to be manually turned to rotate the landing gear shaft 201 and extend and retract the legs 17 and 18 of the landing gear 200.

Figure 3A:
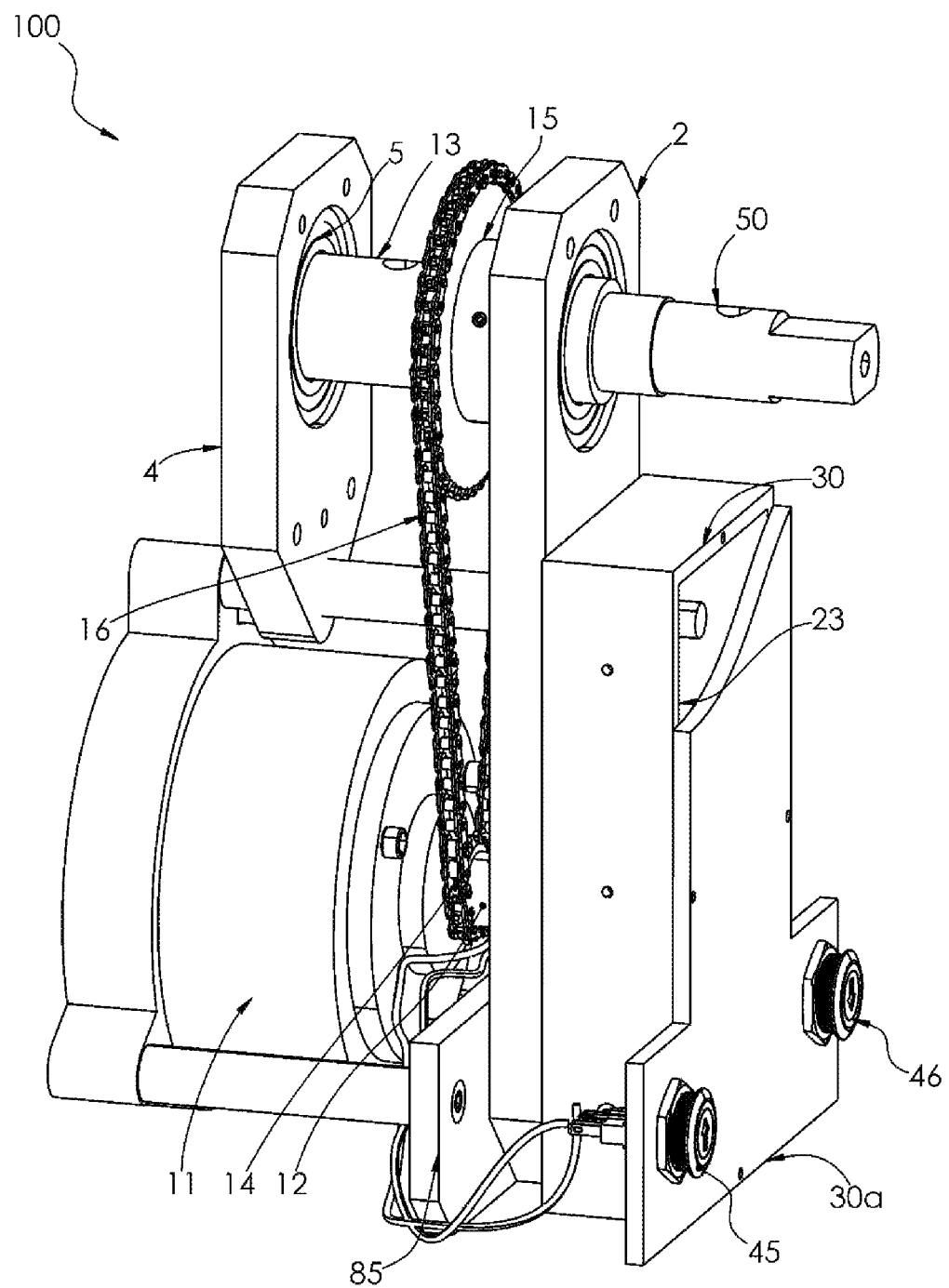
FIG. 3A is a perspective view of the electric powered landing gear device with casing taken off.
Figure 3B:
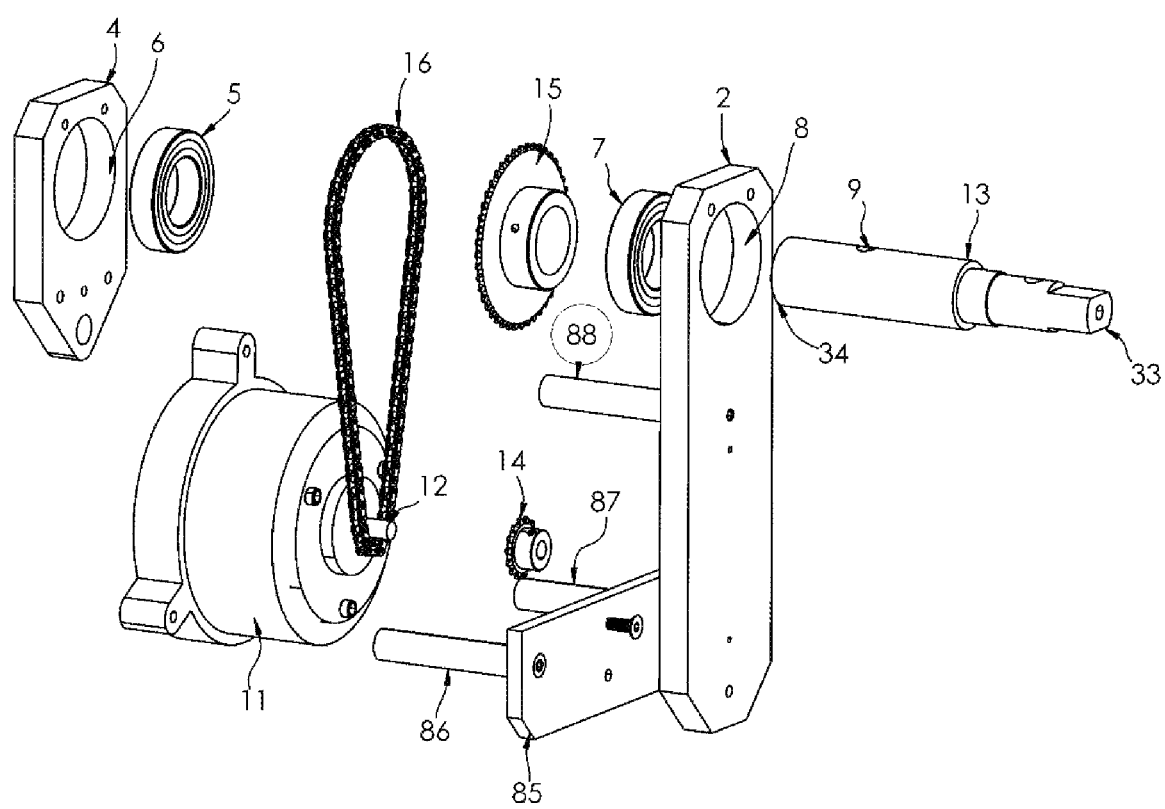
FIG. 3B is an exploded perspective view of the electric powered landing gear system.

According to FIGS. 3A and 3B the main shaft 13 is a hollow shaft having a proximal end 33 and a distal end 34. The proximal end 33 has an extending outwardly portion adapted to be operated by a hand crank.

In accordance with an embodiment of the present invention the device 100 has an electric motor 11 which is preferably a 3-phase electric motor and has a motor shaft 12. A set of sprockets-and-chain mechanism is provided to transmit the rotary motion between the motor shaft 12 and the main shaft 13. The sprockets-and-chain mechanism comprises a small sprocket 14 and a large sprocket 15 that mesh with a chain 16. The ratio of small-to-large sprocket is selected to match the motor torque, and the required torque for the landing gear 200. The motor shaft 12 carries the small sprocket 14, which drives the chain 16, which, in turn, drives the large sprocket 15 on the main shaft 13. The sprockets 14 and 15 are aligned in a manner to rotate together.

The electric motor 11 is secured rigidly in place by a front long plate 2 and a back short plate 4. The front plate 2 and back plate 4 each have an aperture 6 and 8 on their top portion adapted to receive the main shaft 13. The main shaft 13 is disposed into both apertures 2 and 4 and rotatably secured inside the holes by a rear bearing 5 and a front bearing 7. The main shaft 13 passes into the short plate hole 4 and passes into the large sprocket 15 and extends to the long plate hole 8 in a rotating manner and extends at the end of the long plate hole 8 and projects from the device casing. The main shaft 13 further has a hole 9 to align with the hole of the landing gear shaft 201 and secure the main shaft 13 to the landing gear shaft 201.

The fundamental assembly of the 3-phase electric motor 11 is known to a person skilled in the art, so that a more detailed description of the electrical method of operation of the electric motor 11 is not given here. The landing gear shaft 201 is borne onto the landing gear legs 17 or 18 and supported in a rotating manner. The electric motor 11 is secured in place by three secure legs, two secure legs 86 and 87 on bottom to be mounted to a mounting plate 85 which is connected to the bottom of the long plate 2 and a secure leg 88 to be mounted to the middle portion of the long plate 2 from one end and to the short plate 4 from other end.

Figure 3C:
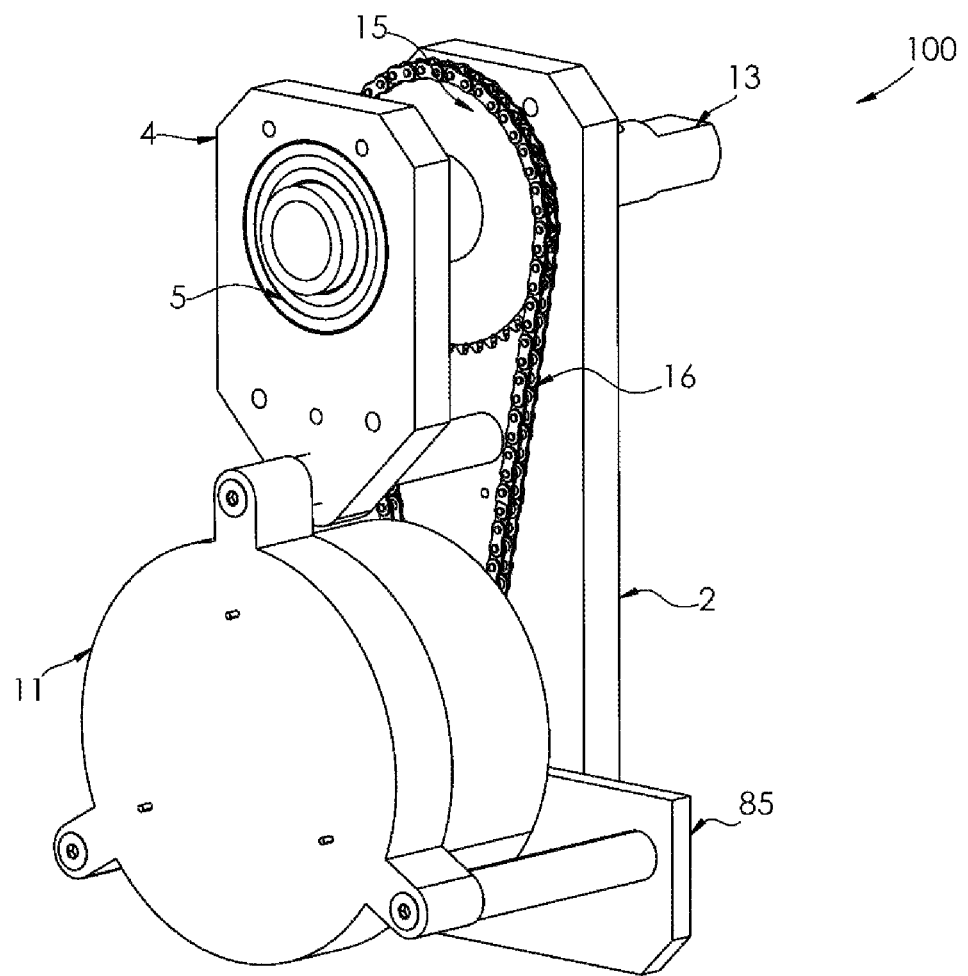
FIG. 3C is a perspective back view of the electric powered landing gear system.
Figure 3D:
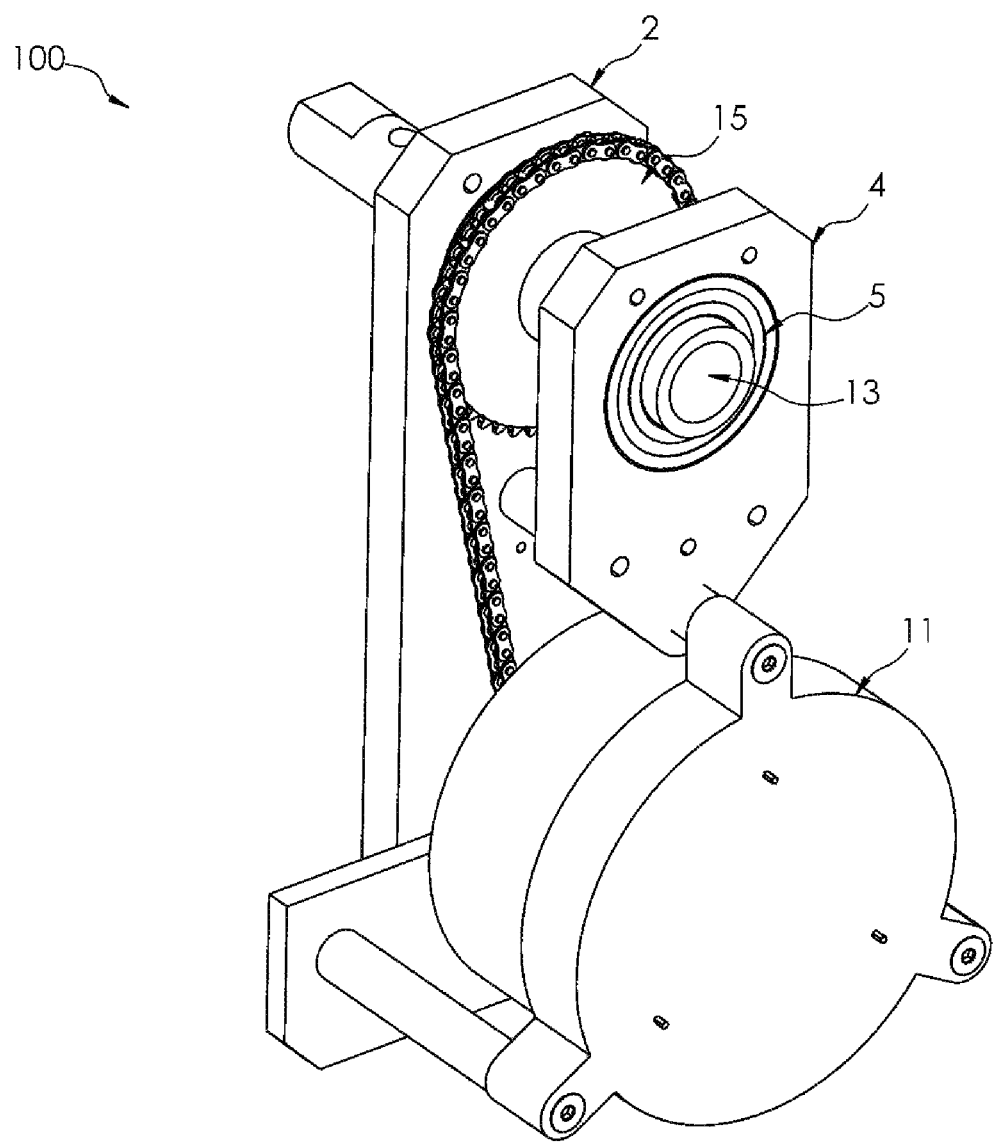
FIG. 3D is a perspective back view of the present invention showing the back bearing for connection of the main shaft of the device to the landing gear shaft.

Referring to FIGS. 3C and 3D the sprocket-and-chain mechanism is designed as a transmission gear mechanism. When the electric motor 11 is ON, the motor shaft 12 rotates and causes the sprocket-and-chain mechanism to rotate the main shaft 13 and thereby rotates the landing gear shaft 201. The electric motor is integrated with a motor controller 23 for controlling the operation of the device 100.

Figure 2:
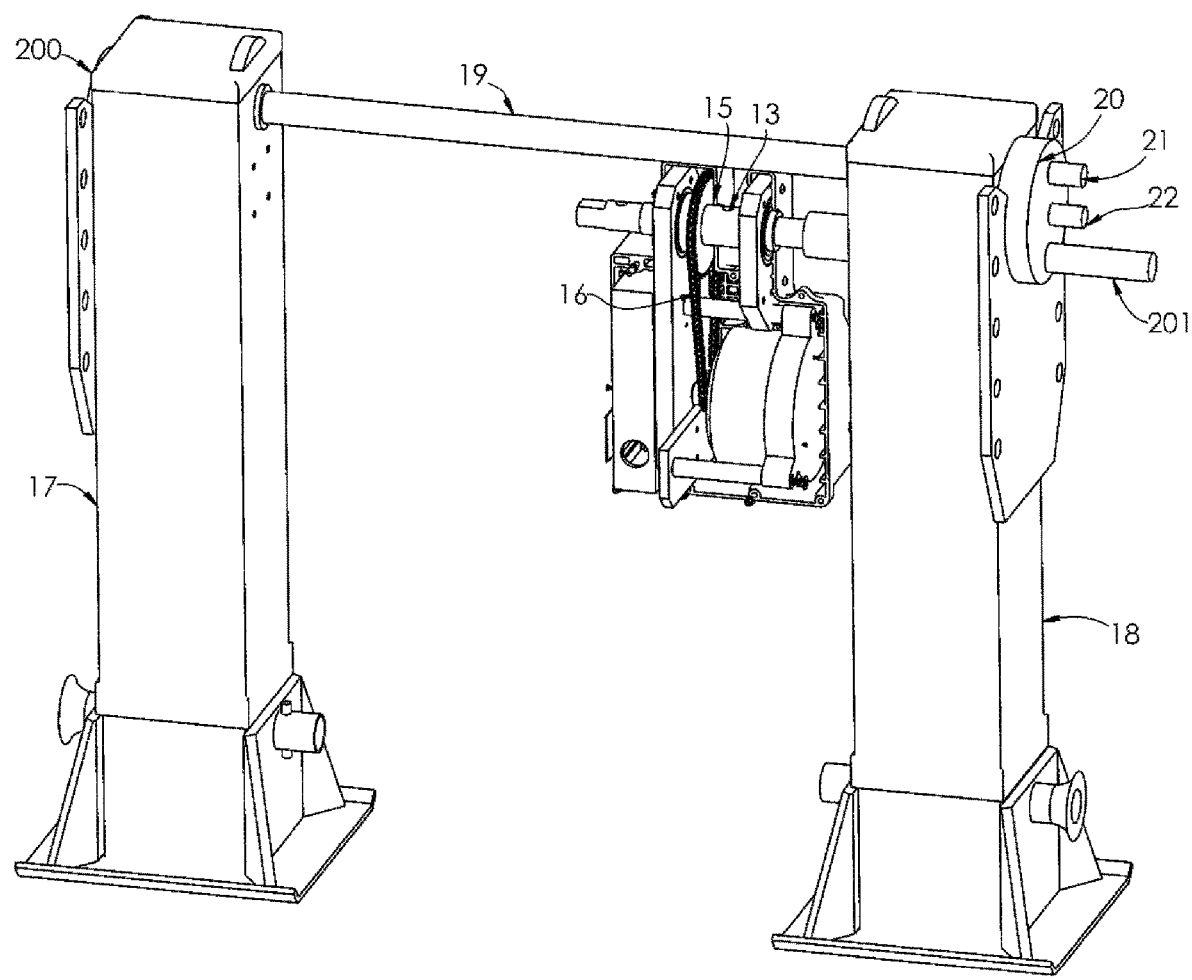
FIG. 2 is a perspective view showing the present invention coupled to the landing gear shaft.
Figure 4:
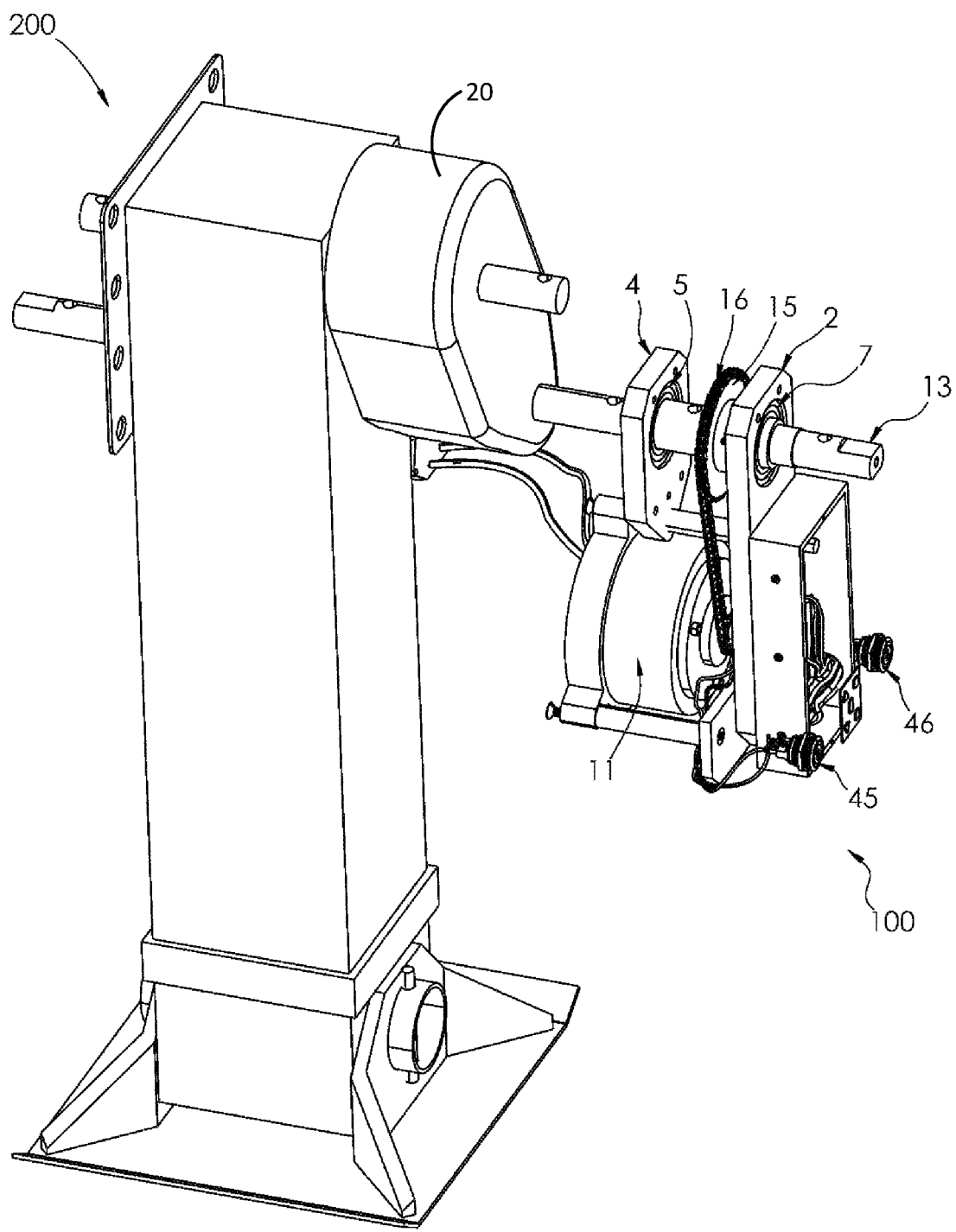
FIG. 4 is a close-up view illustrating the connection of the device to a landing gear.
Figure 5A:
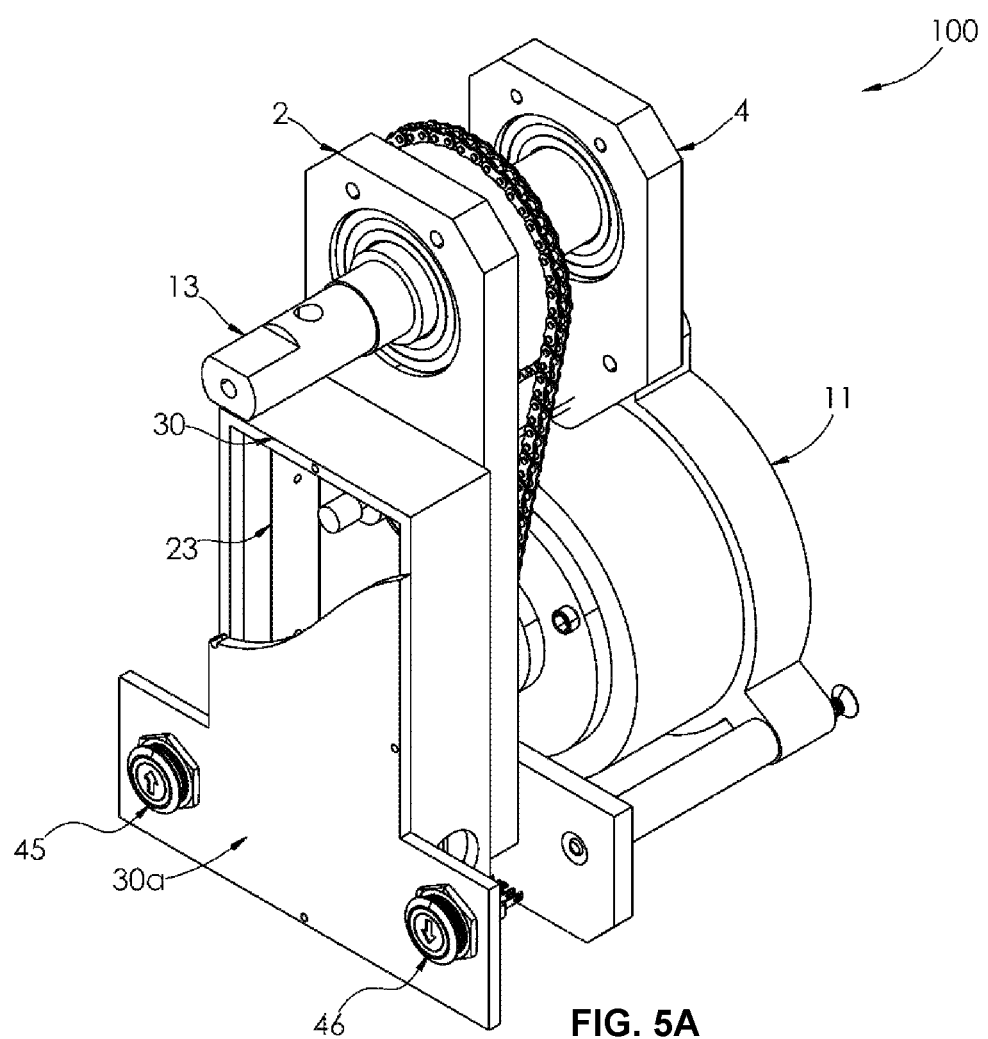
FIG. 5A is a perspective front view of the present invention showing simplified motor controller.
Figure 5B:
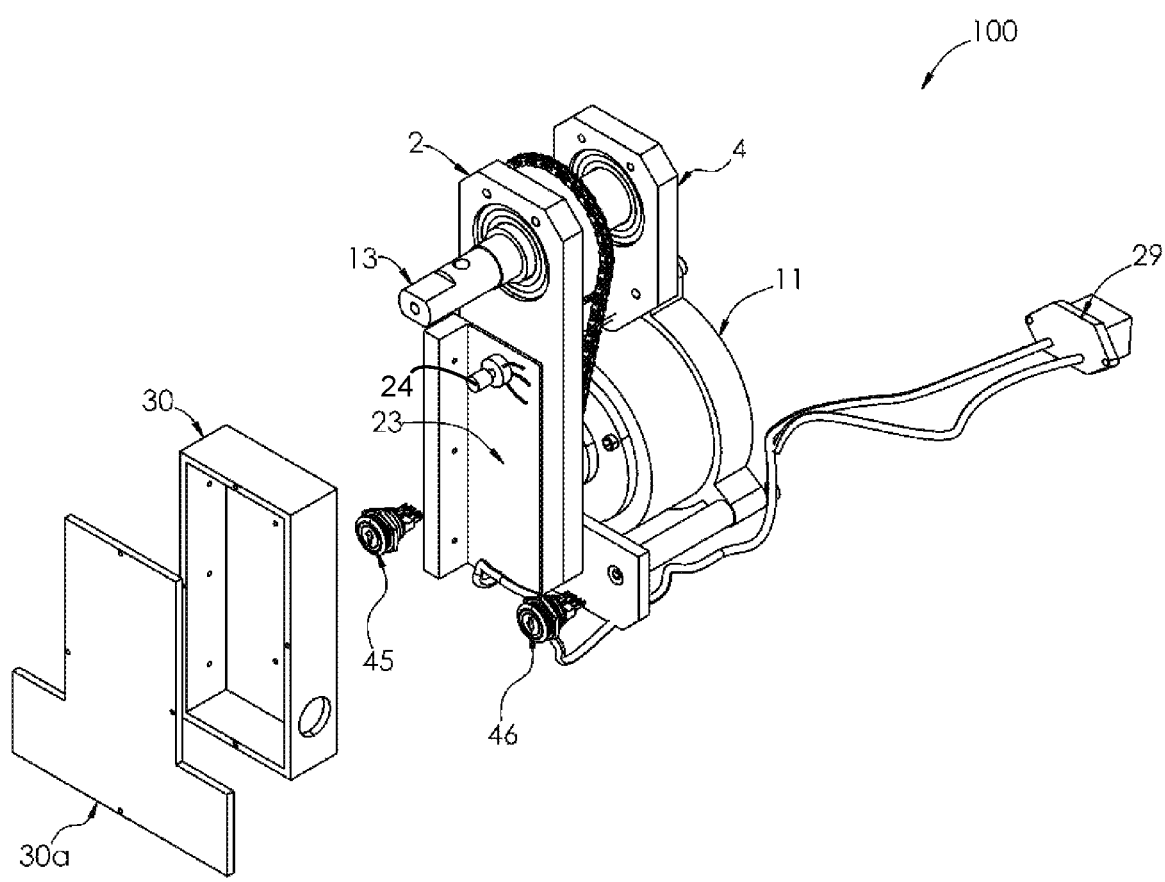
FIG. 5B is an exploded view of simplified motor controller of the device according to FIG. 5A.
Figure 5C:
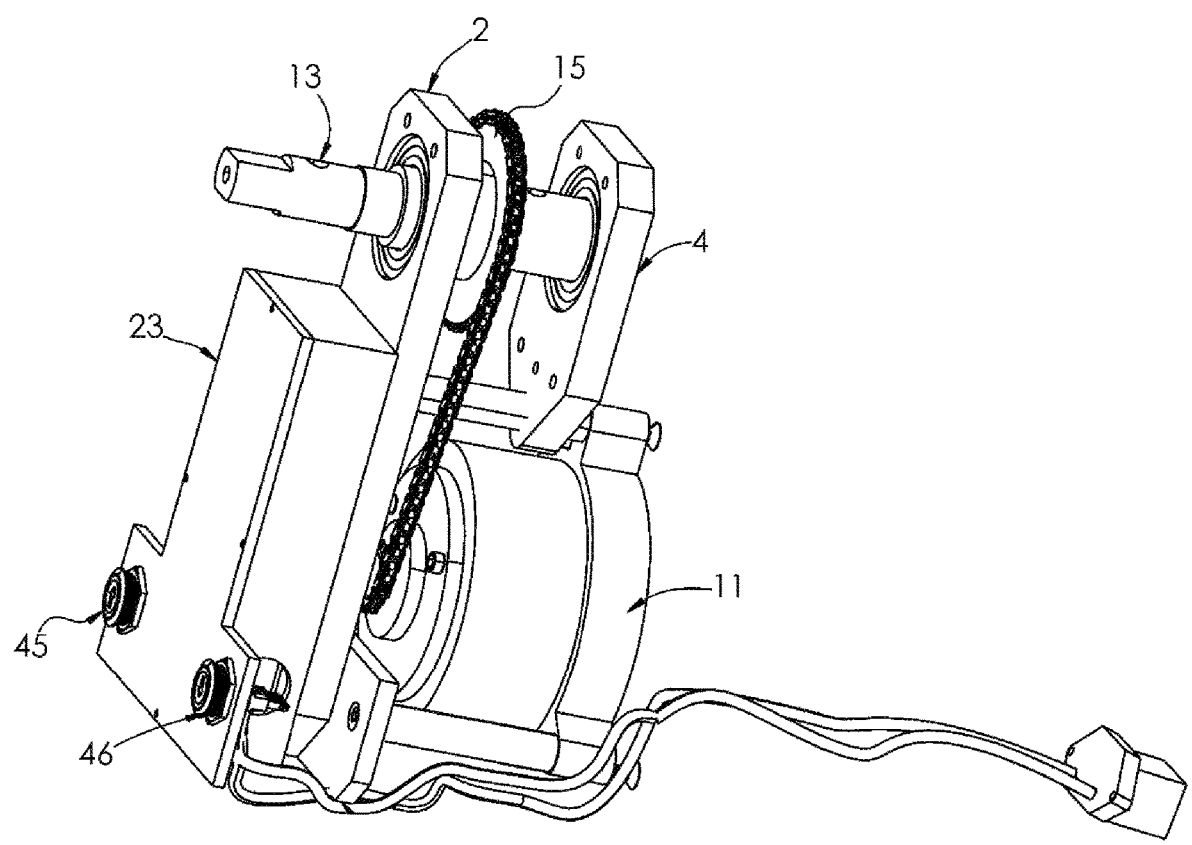
FIG. 5C is a perspective side view of the device showing the motor controller housing according to FIGS. 5A and 5B.
Figure 6A:
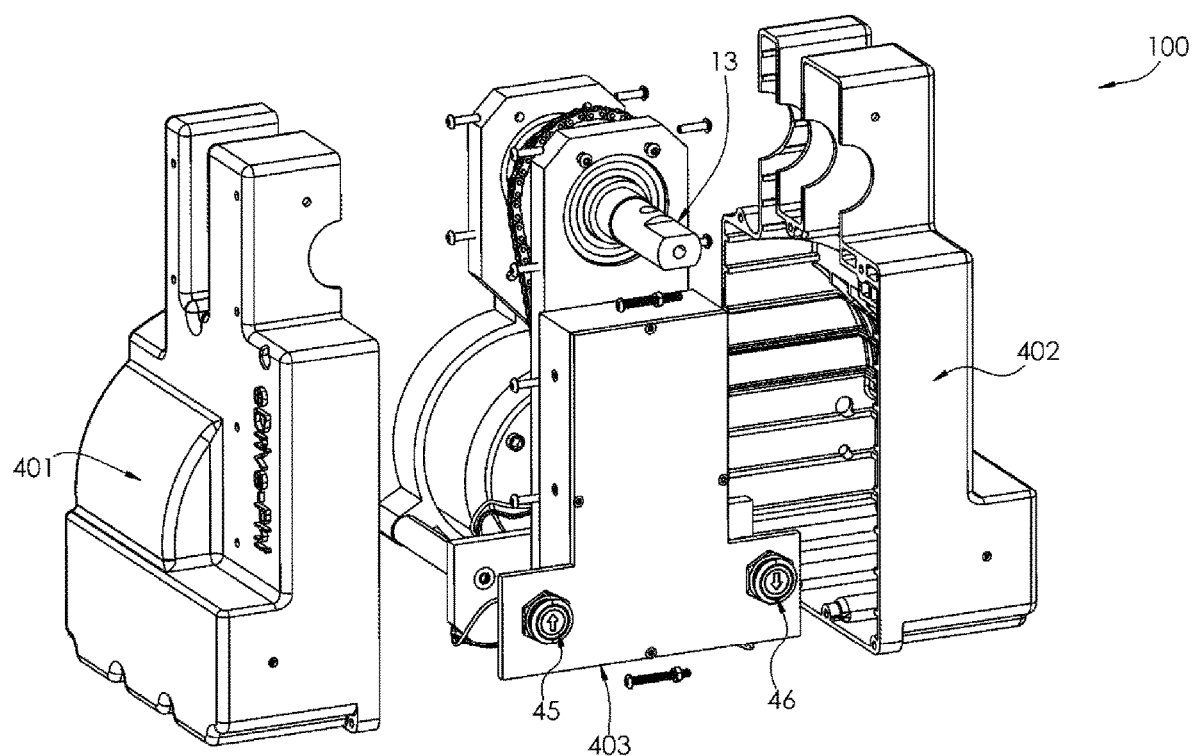
FIG. 6A is an exploded view of the present invention in accordance with the casing.
Figure 6B:
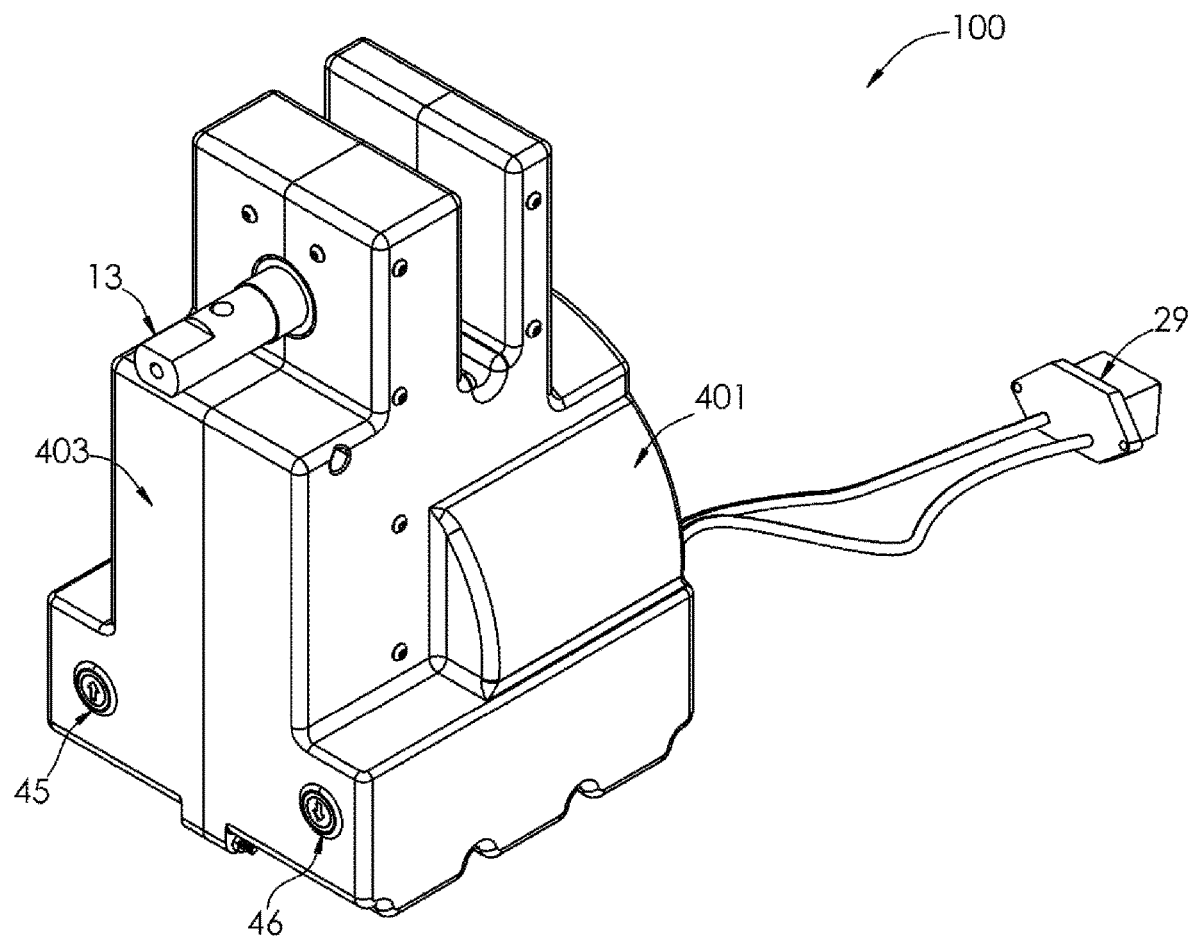
FIG. 6B is a perspective view of the right side of the present invention casing.
Figure 6C:
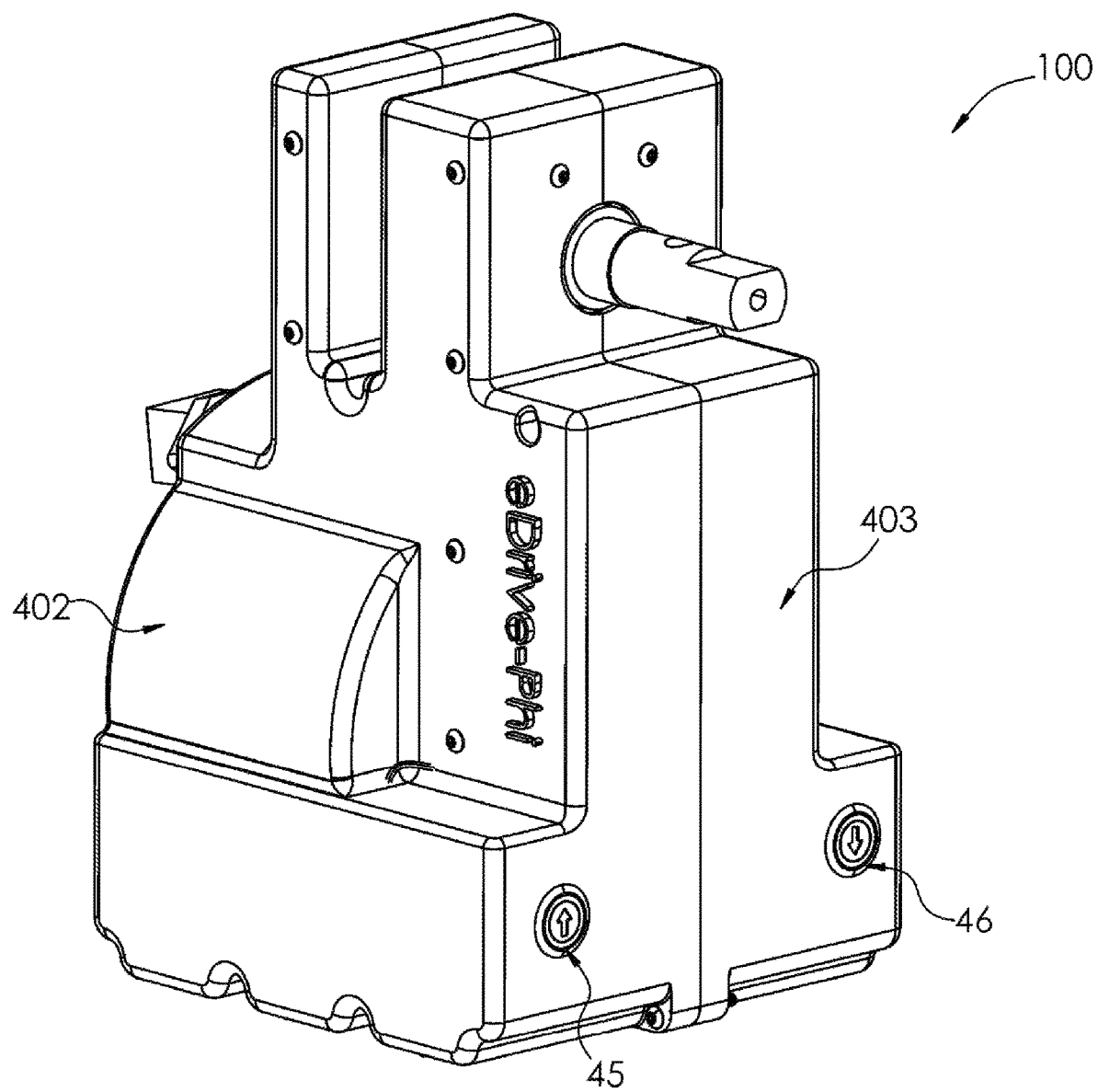
FIG. 6C is a perspective view of the left side of the present invention in accordance with the casing.
Figure 7A:
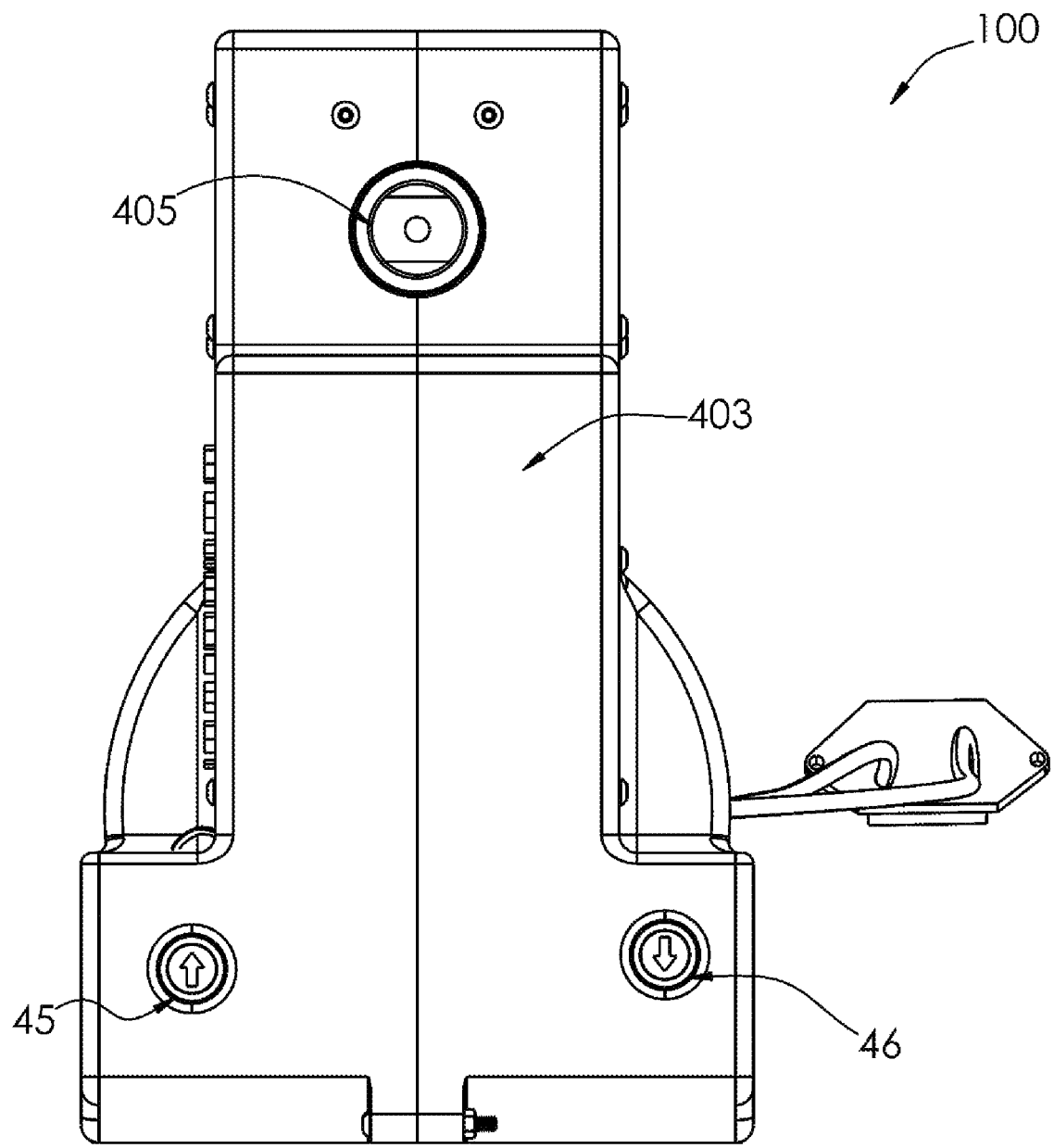
FIG. 7A is a front view of the present invention in accordance with the casing.
Figure 7B:
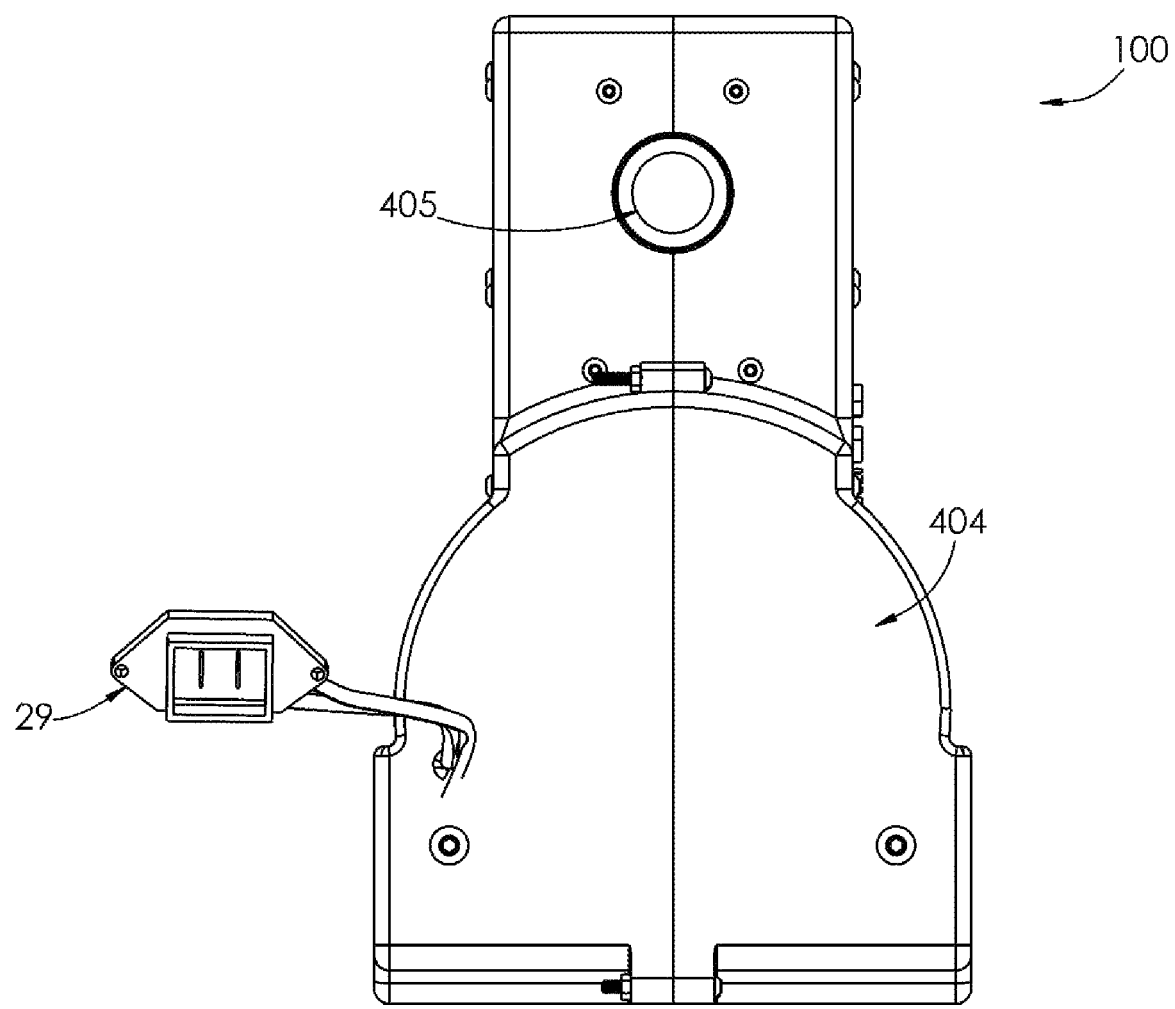
FIG. 7B is a back view of the present invention in accordance with the casing.

According to FIGS. 2 and 4 the sprocket-and-chain mechanism transfers the torque and speed from the motor shaft 12 to the main shaft 13. The power is transmitted from the motor shaft 12 to the sprocket 14 which is rotatably attached to the motor shaft 12. The power is then transmitted to the sprocket 15 through the chain 16. Drive is therefore from electric motor 11 to main shaft 13 through the sprockets 14 and 15. The landing gear shaft 201 is connected to the gearbox 20 on the landing gear 200 which is affixed to the screw shaft (not shown) that ensures transfer of rotation of the landing gear shaft 201 which provides the vertical motion to the legs 17 and 18. The gear box 20 may include intermediately shafts 21 and 22. The landing gear legs 17 and 18 are connected via a cross-shaft 19. The main shaft 13 is connected to the landing gear shaft 201 and extended into the gearbox 20 from one end through an aperture on the device casing. The electric motor 23 comprises a housing which accommodates the electric motor.

The device 100 incorporates a DC-to-AC motor controller 23 to operate the system. The motor controller 23 incorporates a speed and torque (current) control configured to provide a variable speed. The speed can be set to a desired speed when installing the device 100. The motor controller 23 is connected to the electric motor 11 through 3-phase wires (not shown). Depending on the number of motor phases the motor controller 23 may be 3-phase or higher phases. The device has a potentiometer 24 accommodated in the motor controller 23 which the user can set the speed at a desired value at the time of installation. The speed and torque control are implemented through a software in the motor controller 23.

The motor controller 23 is connected to the outer surface of the long plate 2 for controlling the operation of the device 100. The motor controller includes a digital electronics processor that implements an algorithm for a sensorless control and for deriving optimum motor running speed, which in turn controls the main shaft 13 rotational speed which correspond respectively to the sprockets-and-chain and the landing gear shaft 201. The electric motor 11 is variable speed. It can be set by the potentiometer 24 based on the requirements of each trailer and customer. Using the electric motor 11 the landing gear is always positioned on low gear. Hence, it eliminates the need for a dual gear ratio. The motor controller 23 comprises a housing 30 to receive the components of the controller and includes a front cover 30a that can be secured to the housing 30 by bolts.

The motor controller 23 will accept a voltage input from the available voltage in the trailers. The controller is optimized to adapt to both 12V and 24V trailer voltages available in the trucking industry. The motor controller may also receive lower or higher voltages. The motor controller 23 includes an electronic circuit to ensure the electric motor 11 current is limited to a set value, to prevent damages due to over current and over voltage to the unit. Preferably when the landing gear legs 17 and 18 are being lowered, the device 100 will stop the electric motor 11 once the landing gear legs 17 and 18 have engaged the ground.

The motor controller 23 continually controls the current and will change the motor speed to the low speed function to provide the additional torque that may be required. If the device 100 is operating in the low motor speed mode and the current drops to a pre-set lower level then the motor controller 23 will undertake to switch the electric motor 11 to the high-speed mode. The power system of the device is housed inside the device casing and is connected to the trailer power system by a connection port 29.

The device is operated by an UP 45 and DOWN 46 switches provided on the device 100. The switches 45 and 46 are connected to the motor controller 23, therefore, the motor controller manages all the control functions of the device 100. In the UP position the raise mode is activated and in the DOWN position the lower mode is activated to lower the landing gear.

In operation by pressing the DOWN switch a signal is received by the motor controller 23 to start the electric motor 11. The landing gear legs 17 and 18 are then lowered by the electric motor 11. When the landing gear legs are engaged with the ground the electric motor 11 automatically stops. By activating the raise cycle by pressing the UP switch a signal is received by the motor controller which starts the electric motor. The landing gear legs 17 and 18 are then raised by the electric motor 11 and when reached to the pre-set level, then the electric motor stops.

Figure 8A:
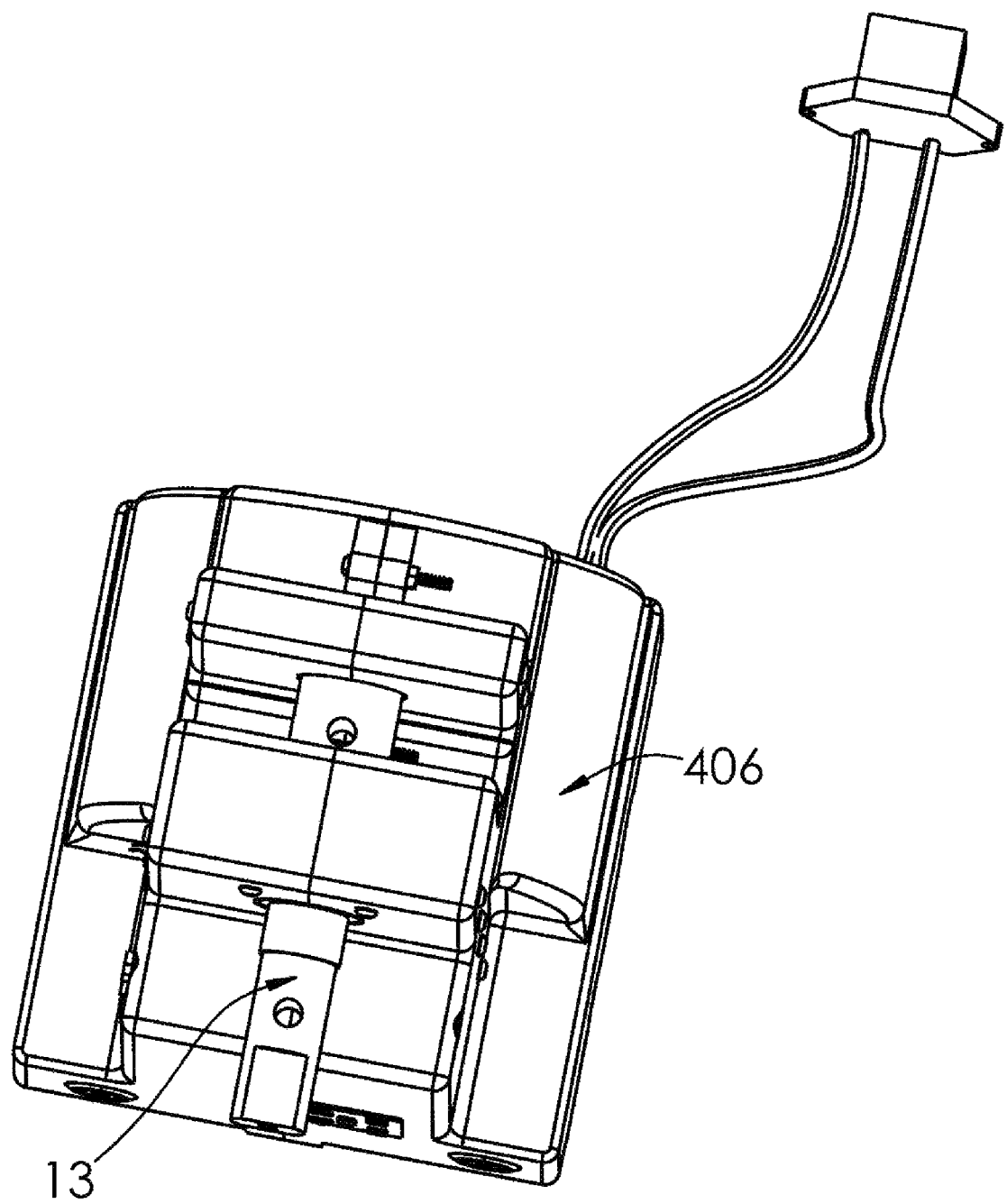
FIG. 8A is a top view of the present invention in accordance with the casing.
Figure 8B:
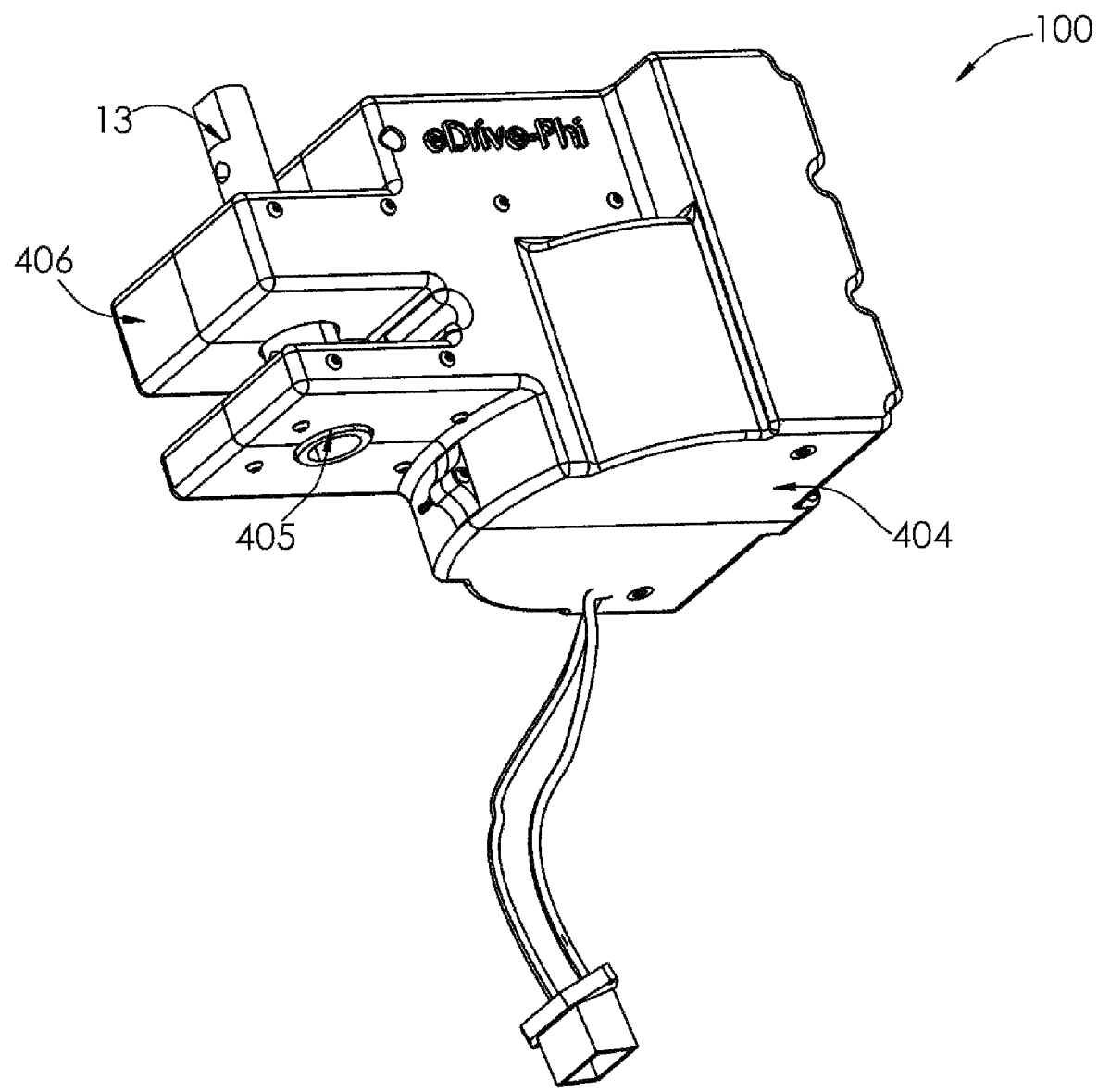
FIG. 8B is top side view of the present invention in accordance with the casing.

As shown in FIGS. 6A to 8B the device includes a device casing to house the components of the device to provide a compact device to be able to be secured to the landing gear legs 17 or 18. The device casing comprises a right side portion 401 and a left side portion 402 having connection means to attach to each other and create an opening 405 extended from the front side 403 to the back side of the device casing for the main shaft 13 to protrude therefrom. The back side of the casing 404 further has an opening for the connection port 29. FIGS. 8A and 8B show a top side of the casing 406 and the position of the main shaft 13.

Figure 9:
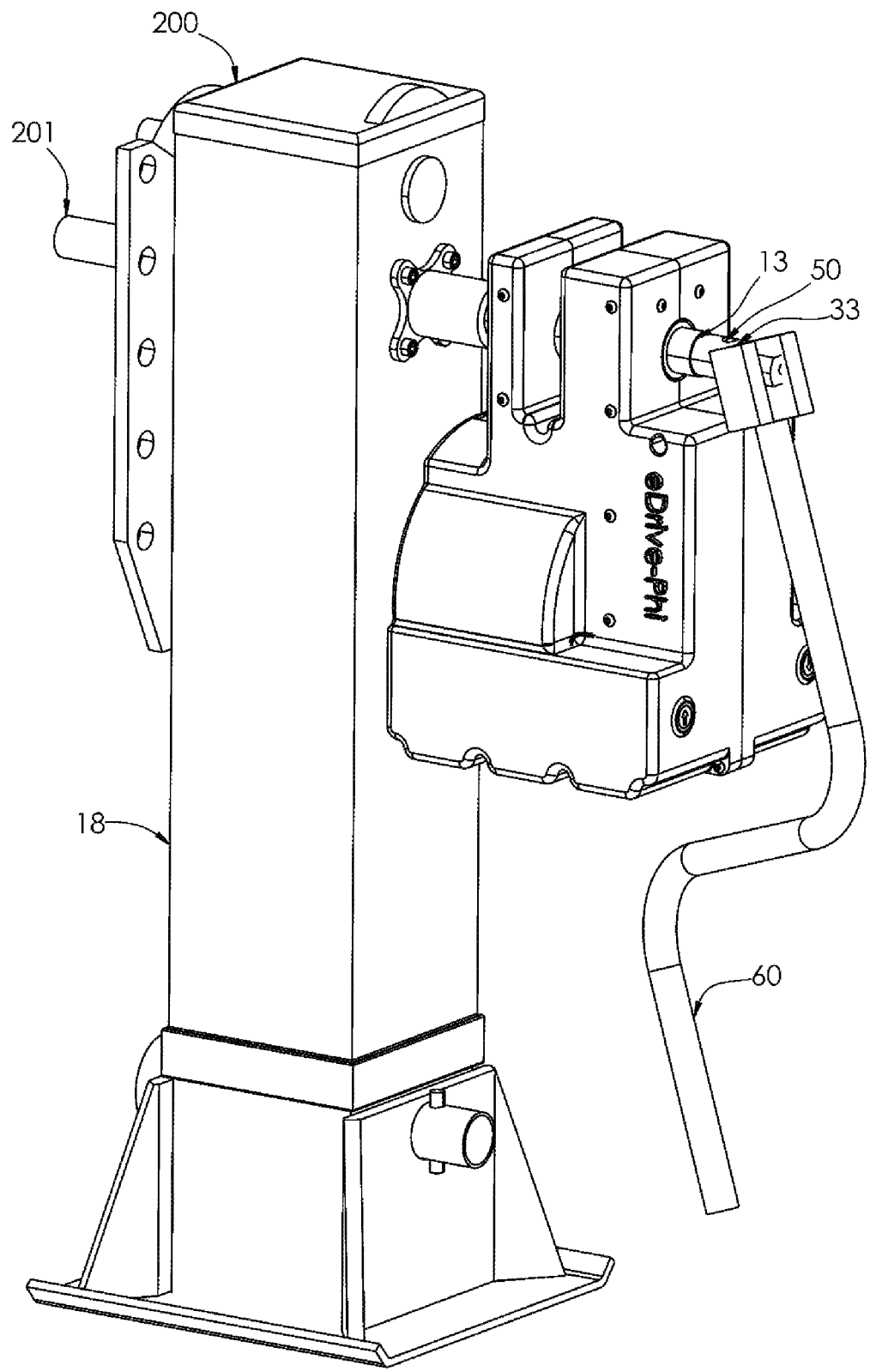
FIG. 9 is a perspective view of the present invention being operated manually by a hand crank.

The conventional mode of operation of the landing gear 200, the legs of the landing gear 17 and 18 are operated by a manual crank handle which is removably attachable to the landing gear shaft 201. The landing gear is then powered by a human operator. The rotary motion of the crank handle is imparted to the landing gear shaft 201. As shown in FIG. 9 the landing gear shaft 201 is connected to the landing gear leg 18. The presented invention includes a main shaft 13 which is extended and has an aperture 50 on its proximal end 33 to secure a hand crank to enable the device to be used manually by a hand crank 60, where in case the unit is not operational. Therefore, the present invention allows for the hand crank to be attached without the need to remove the unit or disconnect the electrical connections, a feature that ensures that the drivers are not stranded, it does not require any removal or re-installation of the unit.

The device 100 is secured on the legs 17 or 18 of the landing gear 200 in various mechanism to prevent the unit from moving around when it is in operation. As the semi-trailers and landing gears vary the manufacturer of the trailers and/or landing gears may provide various securing systems.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An electric powered device for raising and lowering a landing gear of a trailer, the landing gear comprising of a pair of legs that are extendable and retractable by rotation of a landing gear shaft, said device comprising:
    a) a main shaft adapted to be coupled to the landing gear shaft;
    b) an electric motor having a motor shaft and a motor controller configured to control a motor speed and a motor torque, and provide a variable speed/torque motor operation;
    c) a sprocket-and-chain mechanism connected to the electric motor, comprising a set of sprockets and chain mechanism arranged between the motor shaft and the main shaft; the set of sprockets and chain mechanism comprising a first small sprocket rotatable around an axis of the motor shaft and a second large sprocket rotatable around an axis of the main shaft, and a chain connecting the first small sprocket and the second large sprocket;

whereby the motor controller is used to control the applied speed and torque on the main shaft and then to the landing gear shaft and to continually adjust the motor speed and eliminate the need for a multi gear ratio for the landing gear.

2. The electric powered device of claim 1, wherein the motor controller comprising a digital electronics processor to determine an optimum running speed and a torque, and an optimum motor shaft rotation speed correspond respectively to the sprocket-and-chain mechanism and the landing gear shaft.

3. The electric powered device of claim 1, wherein the motor controller further comprises a current control configured to control the changes in a current to start or stop the device,
    whereby the motor controller continually controls the current so that the landing gear is always adjusted to be on a low gear, hence eliminating dual or multi gear ratios for the landing gear.

4. The electric powered device of claim 1, wherein the electric motor is a 3-phase electric motor powered by the trailer through the motor controller to operate the device.

5. The electric powered device of claim 1, wherein the motor controller has a potentiometer to set a desired speed.

6. The electric powered device of claim 1, wherein the device comprising:
    a) a front plate and a back plate; the front plate has a front aperture on a top portion having a front bearing and the back plate has a back aperture on the top portion having a back bearing, wherein the front aperture and the back aperture align and adapted to rotatably receive the main shaft and wherein the main shaft passes into the back aperture and extends into the second large sprocket and extends into the front aperture in a rotating manner and projects from the front aperture;
    b) a motor controller housing;
    c) a casing adapted to house the device comprising: a right cover portion and a left cover portion being secured to each other in a manner to house the device and have openings configured to allow the main shaft to protrude therefrom, the casing further comprising: a front side, a rear side, a top side and a bottom side;
    d) a set of switches comprising an UP switch and a DOWN switch on the casing to control the operation of the device;
        whereby the main shaft is secured to the landing gear shaft through the back bearing to rotate the landing gear shaft and extend and retract the landing gear legs.

7. The electric powered device of claim 1, wherein the motor controller is a DC-to-AC motor controller.

8. The electric powered device of claim 1, wherein the set of switches are connected to the motor controller through signal wires;
    whereby the motor controller receives indication from the set of switches to operate the device from an off to either a raise or a lower mode and when the landing gear legs are lowered, stops the electric motor once the landing gear legs have engaged the ground.

9. The electric powered device of claim 1, wherein the main shaft is a hollow shaft having an extending outwardly portion protruded from the front aperture and adapted to be operated manually by a hand crank.

* * * * *